No. 801,083. PATENTED OCT. 3, 1905.
J. K. HOLTMANN.
VEHICLE WHEEL.
APPLICATION FILED MAR. 25, 1905.
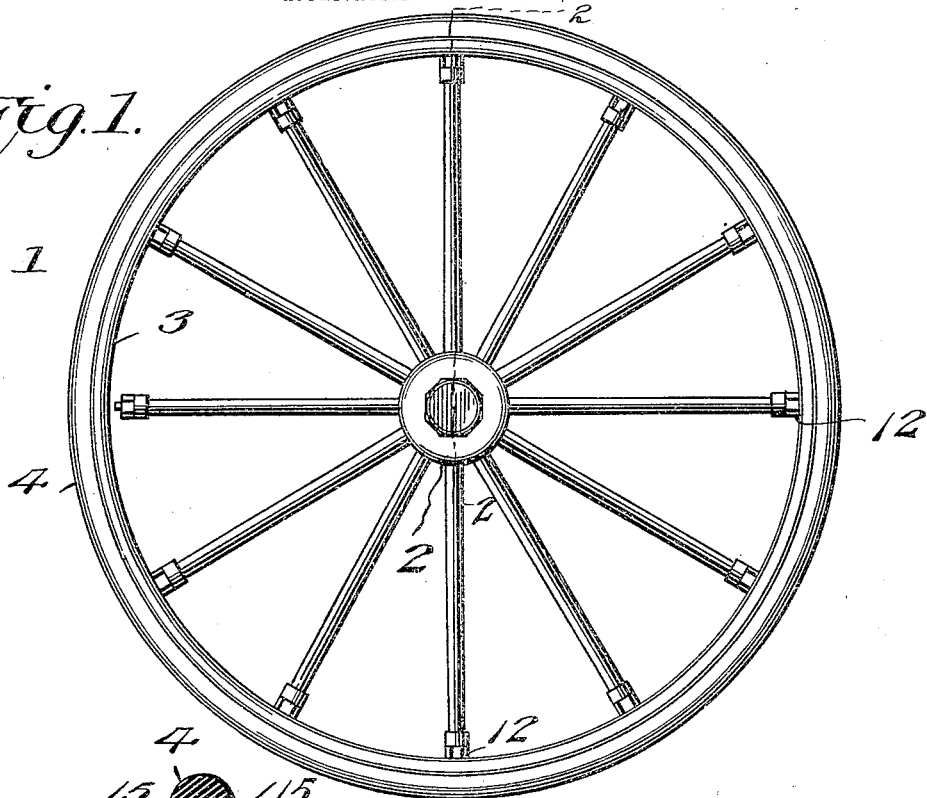
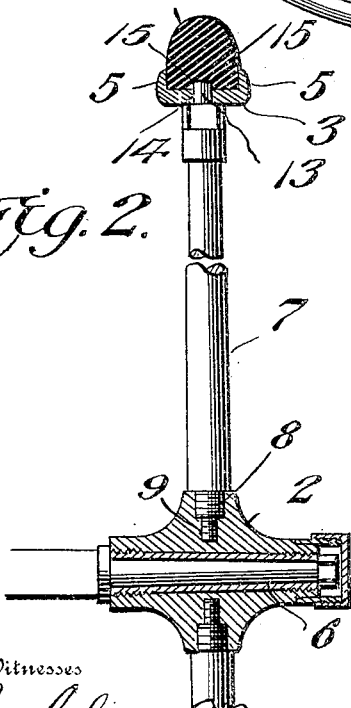
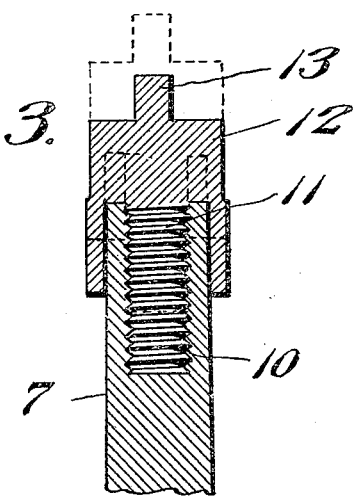
Witnesses
Geo. Ackman Jr.
F. S. Elmor
Inventor
John K. Holtmann
By Victor J. Evans
Attorney

UNITED STATES PATENT OFFICE.

JOHN KASPER HOLTMANN, OF ST. LOUIS, MISSOURI.

VEHICLE-WHEEL.

No. 801,083.  Specification of Letters Patent.  Patented Oct. 3, 1905.

Application filed March 25, 1905. Serial No. 252,046.

*To all whom it may concern:*

Be it known that I, JOHN KASPER HOLTMANN, a citizen of the United States of America, residing at St. Louis, State of Missouri, have invented new and useful Improvements in Vehicle-Wheels, of which the following is a specification.

This invention relates to vehicle-wheels, and has for its objects to produce a comparatively simple inexpensive device of this character in which the spokes may be readily removed, one in which the spokes will be maintained firmly and securely in position, and one in which the spokes will serve to hold the tire in position upon the rim.

With these and other objects in view the invention comprises the novel features of construction and combination of parts more fully hereinafter described.

In the accompanying drawings, Figure 1 is a side elevation of a vehicle-wheel embodying the invention. Fig. 2 is a detail view, partly in section and on an enlarged scale, the section being taken on the line 2 2 of Fig. 1. Fig. 3 is an enlarged detail view in section of the outer end of one of the spokes.

Referring to the drawings, 1 designates the wheel, which as a whole comprises a hub 2, a rim 3, and a tire 4, the rim being provided, as seen in Fig. 2, with side flanges 5, between which the tire is seated, while the hub 2 has a tapered central bore in which is arranged as usual a tapered metal box 6, having its ends in threaded engagement with the hub, it being apparent that owing to the box being tapered and the bore of the hub being correspondingly tapered the box may be introduced into position by entering its smaller end into the larger end of the bore and finally rotated within the latter to properly engage the threads.

Extended radially between the hub and rim is a series of spokes 7, each having at its hub-engaging end a primary threaded engaging portion 8 and a secondary engaging portion 9, also threaded and of smaller diameter than the portion 8, while the outer end of each spoke is formed with an internally-threaded recess 10, designed to receive the externally-threaded spindle 11 of an adjustable sleeve or section 12, provided with an outer reduced portion or extension 13, adapted for engagement with the wheel-rim 3. The section 12 is preferably in the form of a tubular thimble, which slips upon the end of the spoke and has formed centrally therein the threaded spindle or core 11, this thimble being telescopical upon the end of the spoke and adjustable lengthwise of the latter through the medium of the threaded connection 10 11.

The wheel-rim 3 is provided at suitably-spaced intervals with openings or perforations 14, designed in practice to register with sockets or seats 15, formed in the inner face of the tire 4, and the extensions 13 are of such length as to extend through the openings 14 and be seated within the sockets 15, thus to maintain the tire in position upon the rim and prevent relative movement of the parts.

In practice the spokes are first engaged with the hub 2 and the tire 4 arranged upon the rim with sockets 15 in register with the openings 14, the outer ends of the spokes being thereafter engaged with the rim and tire by rotating the sleeves or thimbles 12 in the proper direction upon their respective spokes to increase the length of the latter, as indicated by dotted lines in Fig. 3, whereupon the reduced extensions 13 will enter through the openings 14 in the rim and be seated within the tire-sockets 15.

From the foregoing it is apparent that I produce a comparatively simple inexpensive device in which the spokes may be readily seated in place and engaged with the hub and rim and one wherein the tire will be held in fixed position to prevent creeping upon the rim, it being understood that in attaining these ends various minor changes in the details herein set forth may be resorted to without departing from the spirit of the invention.

Having thus described the invention, what is claimed as new is—

In a wheel, a hub, a rim provided with a perforation, a tire seated on the rim and having a socket in register with said perforation, a spoke having an axially-disposed internally-threaded recess, a tubular thimble seated telescopically on the spoke and provided with an externally-threaded central core entered into and in threaded engagement with the recess, and a reduced extension provided in the thimble and designed to enter through the perforation in the rim and be seated in the tire-socket.

In testimony whereof I affix my signature in presence of two witnesses.

JOHN KASPER HOLTMANN.

Witnesses:
JOSEPH V. GRIMM,
J. F. HELLRUNG.